United States Patent [19]

Miyamoto

[11] Patent Number: 5,514,233

[45] Date of Patent: May 7, 1996

[54] AUTO-SPLICE DEVICE

[75] Inventor: Yoshinori Miyamoto, Nagasaki, Japan

[73] Assignee: Mitsubishi Jukogyo Kabushiki Kaisha, Tokyo, Japan

[21] Appl. No.: 196,368

[22] Filed: Feb. 15, 1994

[30] Foreign Application Priority Data

Feb. 16, 1993 [JP] Japan .................................. 5-026701
Mar. 2, 1993 [JP] Japan .................................. 5-041330

[51] Int. Cl.[6] ........................................................ B32B 31/10
[52] U.S. Cl. .......................... 156/64; 156/159; 156/364; 156/507; 156/512; 83/42; 83/27; 83/73; 83/80; 83/160; 83/732; 271/228
[58] Field of Search ........................ 156/512, 354, 156/355, 364, 159, 64, 507; 83/26, 27, 42, 73, 79, 80, 160, 732; 271/228

[56] References Cited

U.S. PATENT DOCUMENTS

| | | | |
|---|---|---|---|
| 3,141,805 | 7/1964 | Gough et al. . | |
| 3,253,489 | 5/1966 | Phillips . | |
| 3,922,937 | 12/1975 | Maddox | 83/80 X |
| 3,956,047 | 5/1976 | Johnson | 156/159 |
| 4,025,384 | 5/1977 | Shiozaki et al. | 156/502 |
| 4,337,112 | 6/1982 | Hollis | 156/512 X |
| 4,455,189 | 6/1984 | Takasuga | 156/502 |
| 4,832,780 | 5/1989 | Ishijo et al. . | |
| 4,960,234 | 10/1990 | Focke | 83/73 X |
| 5,238,234 | 8/1993 | Kerber et al. | 271/228 X |
| 5,247,761 | 9/1993 | Miles et al. | 47/1.01 |
| 5,366,581 | 11/1994 | Kuramoto et al. | 156/364 |

FOREIGN PATENT DOCUMENTS

| | | |
|---|---|---|
| 0434404 | 6/1991 | European Pat. Off. . |
| 2-151426 | 6/1990 | Japan . |
| 4-113831 | 4/1992 | Japan . |

Primary Examiner—Mark A. Osele
Attorney, Agent, or Firm—Wenderoth, Lind & Ponack

[57] ABSTRACT

An auto-splice device includes a cutting conveyer on which a sheet is cut to produce a fabric, a vacuum take-out unit for taking the fabric from the cutting conveyer onto a take-out conveyer, and a splice mechanism for splicing the fabric to another fabric on the take-out conveyer. A sheet end position measuring unit controls the location at which the fabric is held by the vacuum take-out unit.

4 Claims, 15 Drawing Sheets

AUTO-SPLICE DEVICE

BACKGROUND OF THE INVENTION

1. Field of the Invention

The present invention relates to an auto-splice device for a bias cutter.

2. Description of the Related Art

A conventional auto-splice is shown in FIGS. 23 to 25. A sheet 3 taken from a discharge conveyer 2 of a supplier 1 (not shown) is manipulated by an end position control unit (EPC unit) 4 to guide one end of the sheet 3 to a cutting conveyer 5. The sheet whose length has been measured is cut by a cutting unit 6, and one end of a fabric 7 thus cut is caught and conveyed by a vacuum conveyance unit 8 so as to be readied for splicing to one end of a fabric 9 the other of which has already been spliced.

The fabric 9 which has been spliced is taken out by a take-out conveyor 10 and is then wound up by a take-up unit 11.

The length of the sheet 3 is measured by controlling a send-out roller 13 so as to send out the sheet 3 by a distance $L_1$ while counting the pulses of an encoder 12 which is mounted on the sheet 3. The fabric 7 which has been cut is positioned in the widthwise direction of the fabric 9 by controlling the cutting conveyor 5 to move by a given distance $L_2$ from the cutting line.

A rear end of the fabric 9 is stopped at a position spaced from a sensor 14 by a given distance $L_3$, and the vacuum conveyance unit 8 is moved back to a position indicated by a signal output from a sensor 15 of the EPC unit 4 so that the vacuum conveyance unit 8 catches the fabric 7. The fabric 7 is then moved by a distance $L_4$ so as to overlap the front end of the fabric 7 and the rear end of the fabric 9 by a predetermined amount.

The above-mentioned conventional device suffers from the following problems.

(1) Even though the sheet is controlled by the end position control unit (EPC unit) so as to be introduced to the cutting conveyor at a given location, the fabric which has been cut sometimes slides on the cutting conveyor, thereby moving laterally. Therefore, even though the vacuum conveyance unit is controlled in accordance with a sensor signal of the EPC unit, the front end of the fabric is not always correctly positioned with respect to the vacuum conveyance unit. As a result, the correct amount of overlapping is not achieved even though the fabric is conveyed over a calculated distance.

(2) Even though the front end of the fabric 7 is conveyed by the vacuum conveyance unit with accuracy, the rear end of the fabric sometimes moves laterally while the fabric is conveyed toward the take-out conveyor. As a result, a so-called dog ear may occur, that is, an inconsistency in the widthwise direction of the spliced portion.

Japanese Patent Unexamined Publication No. Hei 3-250133 discloses a device which cuts a sheet to form a fabric, lifts the fabric in its entirety and transfers it from the cutting position to a junction take-out conveyer, positions the fabric parallel to a fabric whose one end has already been spliced, and joins the fabrics by first overlapping ends of the fabrics by a predetermined amount.

Japanese Patent Unexamined Publication Nos. Hei-2-151426, Sho 52-112674, Sho 62-5844 and the like, disclose devices which cut a sheet to form a fabric, discharge the fabric from a cutting conveyer to a joining conveyer in a free state, and thereafter detect an end of the fabric with a sensor in an attempt to correctly position the fabric prior to splicing.

These conventional devices suffer from the following problems.

(3) The device disclosed by Japanese Patent Unexamined Publication No. Hei 3-205133 has a complex structure and requires extremely complex calculations to match the positions of the fabrics to be spliced.

(4) The devices disclosed by Japanese Patent Unexamined Publication Nos. Hei 2-151426, Sho 52-112674, Sho 62-5844, etc. also have complex structures and are limited in their ability to correct the position of the fabric. In particular, when a cutting angle is at an acute angle such as 45° to 60°, it is actually impossible to correct the position of the fabric within an acceptable range.

SUMMARY OF THE INVENTION

An object of the present invention is to eliminate the above-mentioned problems with the conventional devices, and is therefore to provide an auto-splice device which provides an overlapping of a fabrics with accuracy to thereby facilitate an excellent splicing of the fabrics.

A further object of the invention is to provide an auto-splice device which has a simple structure and yet is capable of retaining the shape of an end of a fabric which is to be joined to another fabric.

In order to achieve the above-mentioned objects, the auto-splice device of the present invention comprises a unit for determining a position of a sheet during a cutting operation, and a controller for controlling a position at which a conveyance unit catches the fabric cut from the sheet in accordance with determined position.

The end of the cut fabric may be detected by a sensor which is installed in a vacuum conveyance unit. However, in this case, the speed at which the sheet is conveyed must be decreased in order to ensure the detection accuracy, as a result of which the cycle time is problematically long.

In the auto-splice device of the present invention, the unit for determining the position of the sheet is capable of detecting any one of the edges of the sheet, or both of the edges.

With this device, the fabric is held by the conveyance unit at a predetermined position and conveyed by the conveyance unit in accordance with the position of the end of the fabric, to thereby ensure a predetermined amount of overlapping with the fabric to be spliced thereto.

Further, the auto-splice device may also include a pair of guide blocks for guiding both side edges of the fabric. The guide blocks are located immediately downstream of a splice position to prevent the rear end of the fabric from moving laterally during conveyance.

Further, the present invention provides an auto-splice device which includes a sheet end position measuring unit for detecting front and rear ends of the cut fabric (new), and first and second holding units which catch and hold the rear end of the cut fabric (new) and the rear end of the joined fabric (old), the holding units being movable up and down, respectively.

These holding units are controlled in accordance with positions detected by the sheet end position measuring unit.

The first holding unit is movable over the length of the cut fabric (new), and the second holding unit is movable by a short distance.

In this auto-splice device, the rear end of the fabric (old) whose front end has already been spliced is caught and lifted up by the second holding unit, and under this state, the front end of the fabric (new) is inserted by the first holding unit into a space under the rear end of the joined fabric (old), and subsequently both the first and second holding units are moved downward so that the front end of the new fabric can be joined by a splice bar to the rear end of the old fabric.

After the new and old fabrics are joined to each other, the second holding unit releases the joined fabric and is then moved upward and rearward whereas the first holding unit advances to a location previously occupied by the second holding unit while holding the rear end of the fabric. Then the second holding unit is brought down to hold the rear end of the joined fabric, whereupon the first holding unit releases the fabric and returns to a home position.

In other words, the rear end of the fabric is always held by one of the first and second holding units, thereby ensuring a constant amount of overlap when splicing is carried out.

DETAILED DESCRIPTION OF THE PREFERRED EMBODIMENTS

A first embodiment of the present invention will be described with reference to FIGS. 1 to 11.

Figure 23:
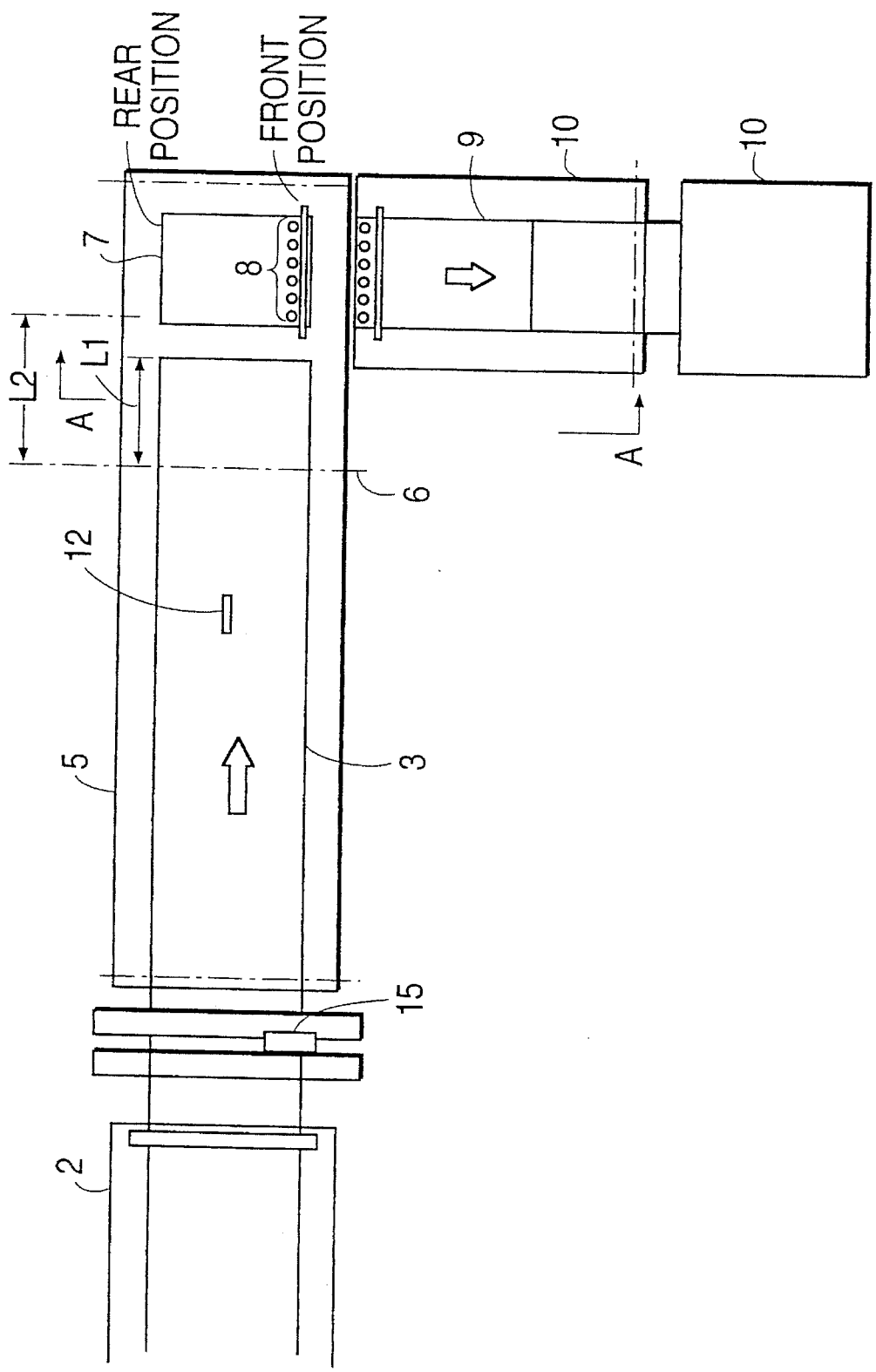
FIG. 23 is a schematic diagram of a conventional bias cutter.
Figure 24:
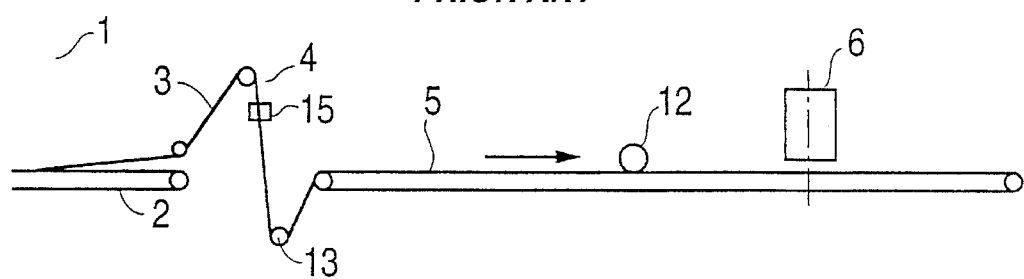
FIG. 24 is a side view of the conventional bias cutter.
Figure 25:
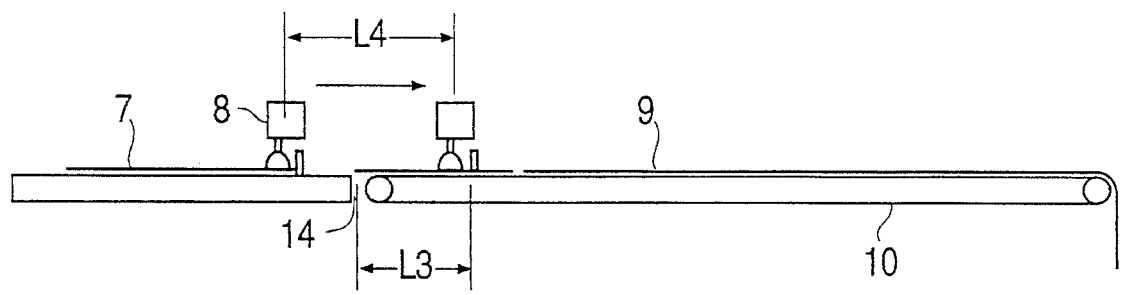
FIG. 25 is a view of the conventional bias cutter taken in the direction of the arrows A—A in FIG. 23.

The operation of (1) positioning a fabric 7 which has been cut from a sheet, (2) conveying the fabric 7 by means of a vacuum conveyance unit 8, and (3) positioning a rear end of the fabric 9 is identical to that carried out by the conventional device as described with reference to FIGS. 23 to 25.

Although reference has been made to cutting the sheet 3 at a right angle, the cutting angle may be any other suitable angle.

Figure 1:
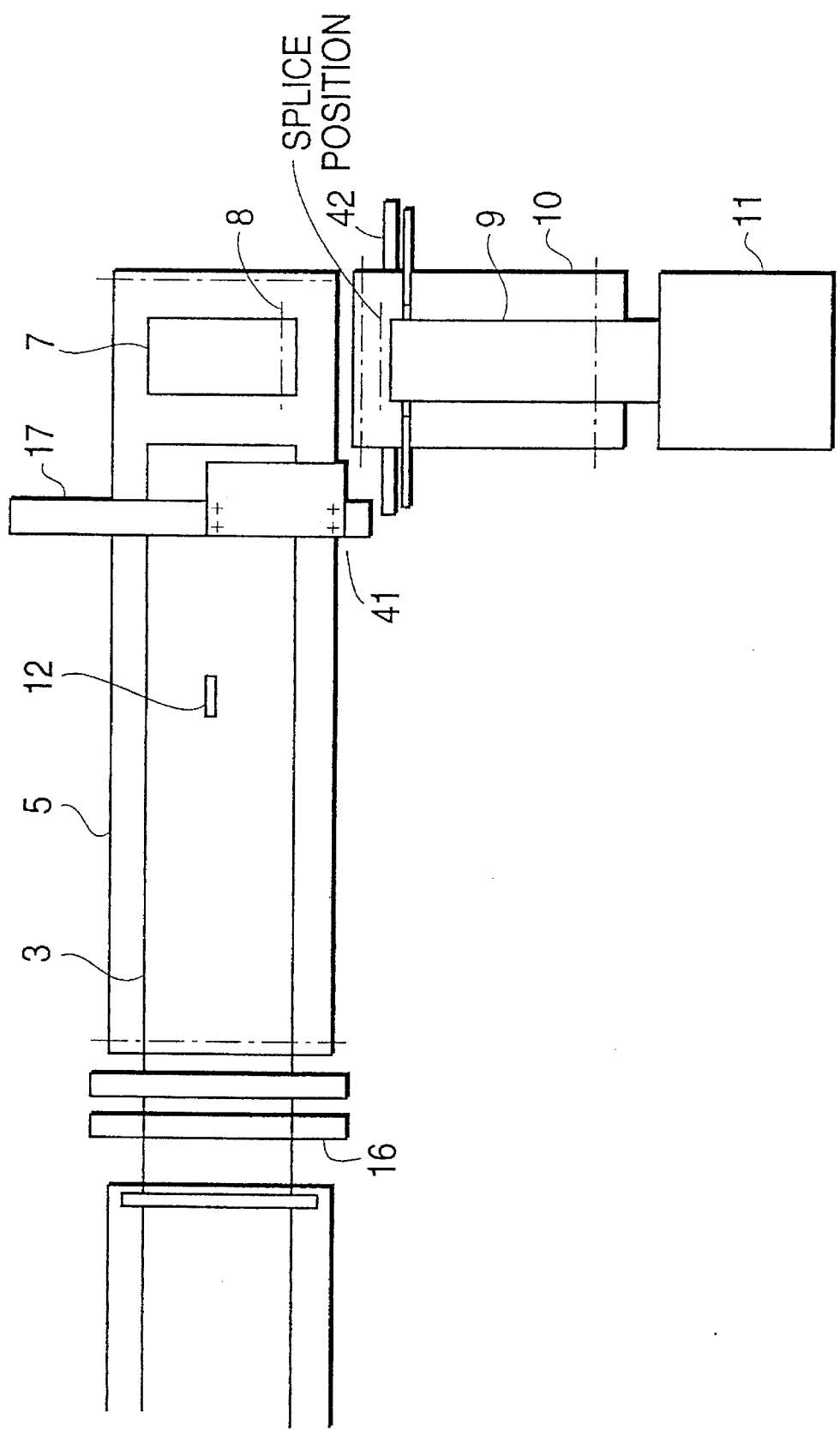
FIG. 1 is a schematic diagram of a bias cutter including a first embodiment of an auto-splice device according to the present invention.
Figure 2:
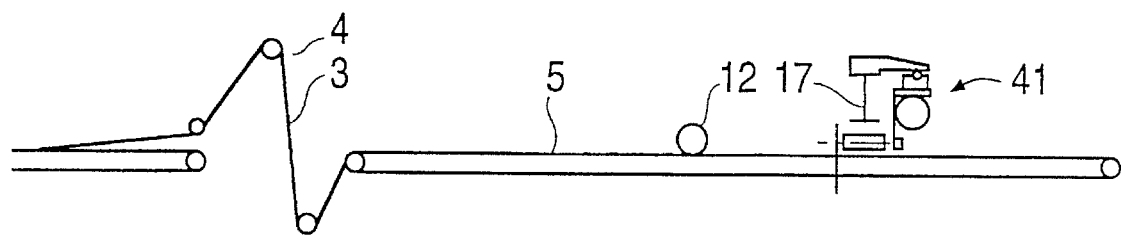
FIG. 2 is a side view of the bias cutter.

FIGS. 1 and 2 show a bias cutter which incorporates an auto-splice device according to the present invention. A roller 16 of the EPC unit 4 can be replaced by a conventional parallel roller without any adverse effect on the overall function of the unit.

Figure 3:
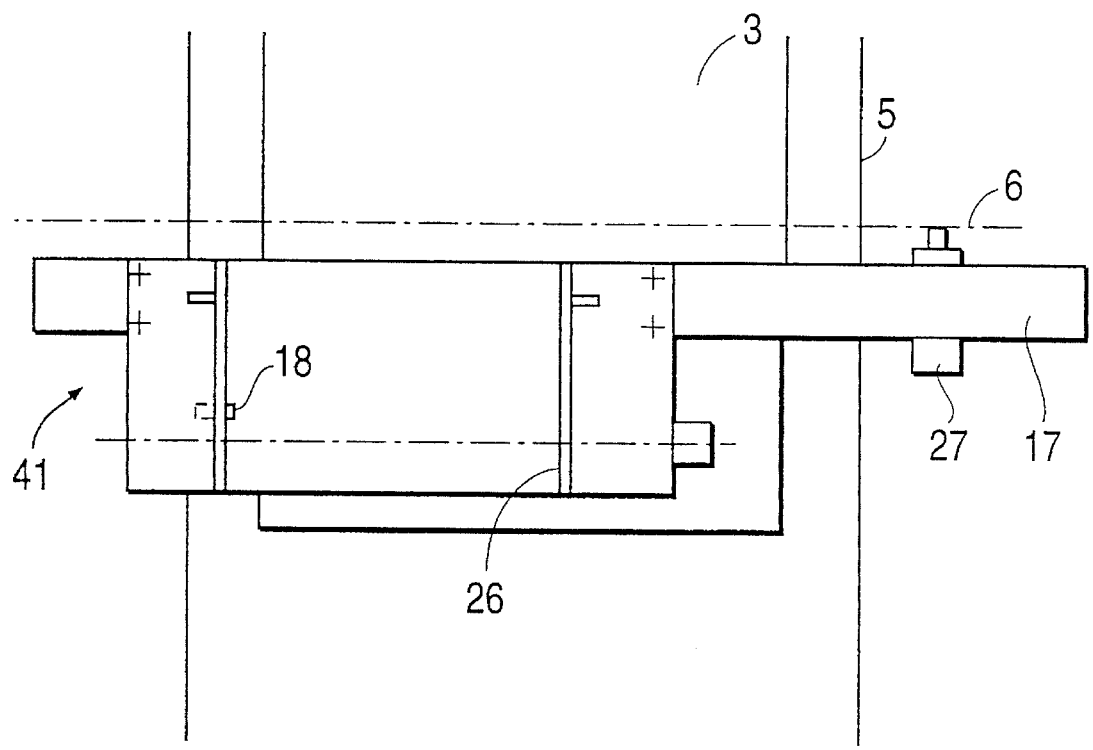
FIG. 3 is a plan view of a sheet end position measuring unit of the auto-splice device.
Figure 4:
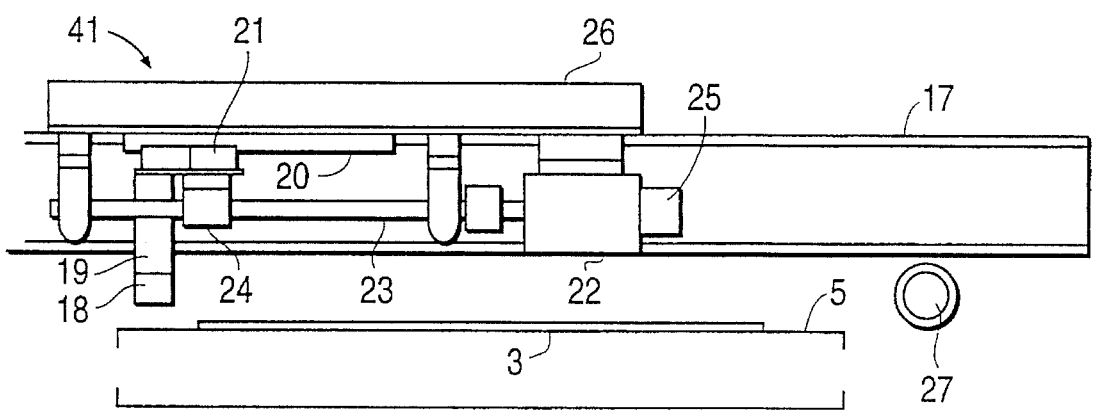
FIG. 4 is a side view of the measuring unit.
Figure 5:
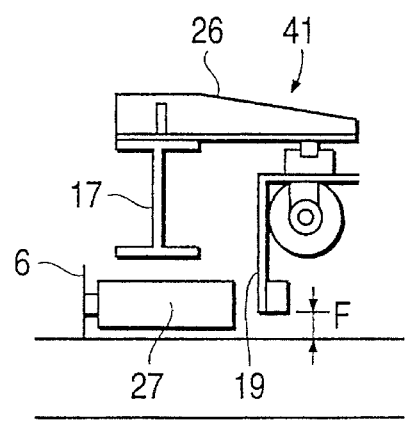
FIG. 5 is a front view of the measuring unit.

Reference numeral 41 denotes a sheet end position measuring unit, the details of which are shown in FIGS. 3 to 5. The sheet end position measuring unit 41 is fixed to a frame 17 of a cutting unit 6 in such a manner that a sensor 18 is disposed parallel to a cutting line and is movable within a range covering possible end positions of the sheet.

The sensor 18 is attached to a bracket 19 at a predetermined height F from a surface of the cutting conveyer 5. The bracket 19 is attached through a slider 21 to a rail 20 disposed parallel to the cutting line of the sheet, and is driven to slide along the rail 20 by a motor 22 via a screw 23 and nut 24. An encoder 25 for detecting the position of the sensor 18 is coupled with an end of a shaft of the motor 22. The rail 20, the motor 22, etc. are attached to a bracket 26 which is fixed to the frame 17. A motor 27 of the cutter 6 is attached to the frame 17 and can be reciprocated by known means (not shown).

Figure 6:
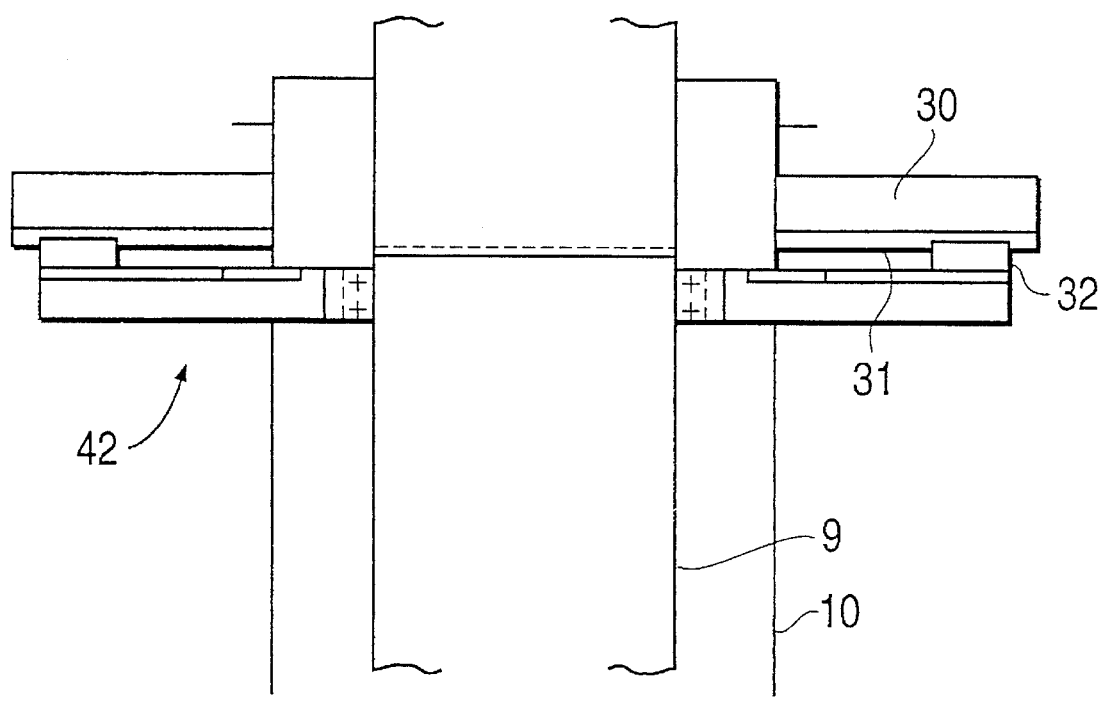
FIG. 6 is a plan view of a fabric guide unit of the auto-splice device.
Figure 7:
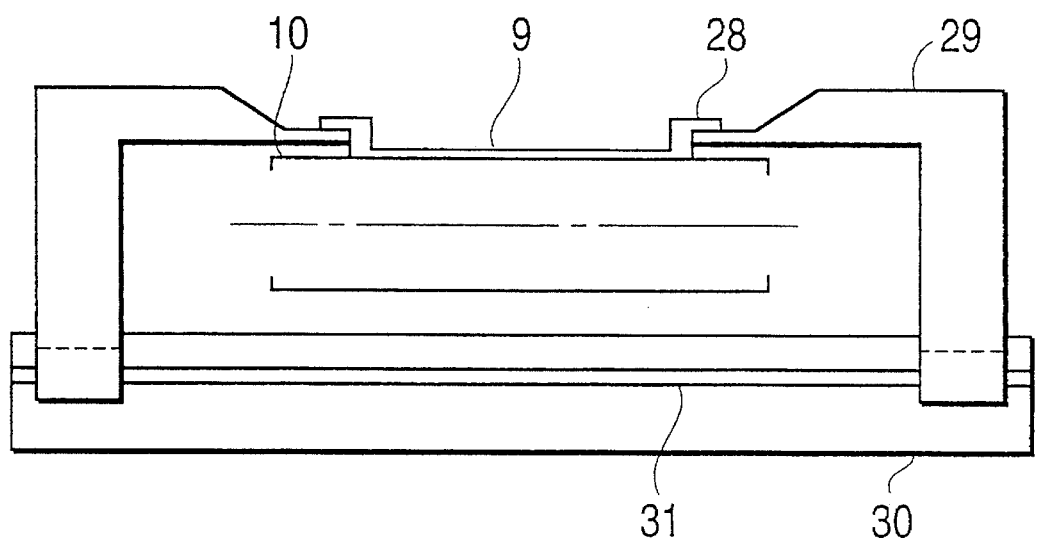
FIG. 7 is a front view of the fabric guide unit.

Reference numeral 42 denotes a fabric guide unit, the details of which are shown in FIGS. 6 and 7. The fabric guide unit 42 is equipped with guide blocks 28 that are to be located immediately downstream of a splice position and in approximate contact with the take-out conveyer 10. The spacing between the guide blocks 28 is adjustable to accommodate for various widths of the fabric 9.

The guide blocks 28 are attached to arms 29, respectively, and each of the arms 29 is attached to a rail 31 and a slider 32 to a frame 30 located under the take-out conveyer 10. The arms 29 can be spread apart and moved together symmetrically with respect to a longitudinal center line of the conveyer 10 by known means (not shown).

The operation of the sheet end position measuring unit 41 will be described with reference to FIGS. 8 to 10.

Figure 8:
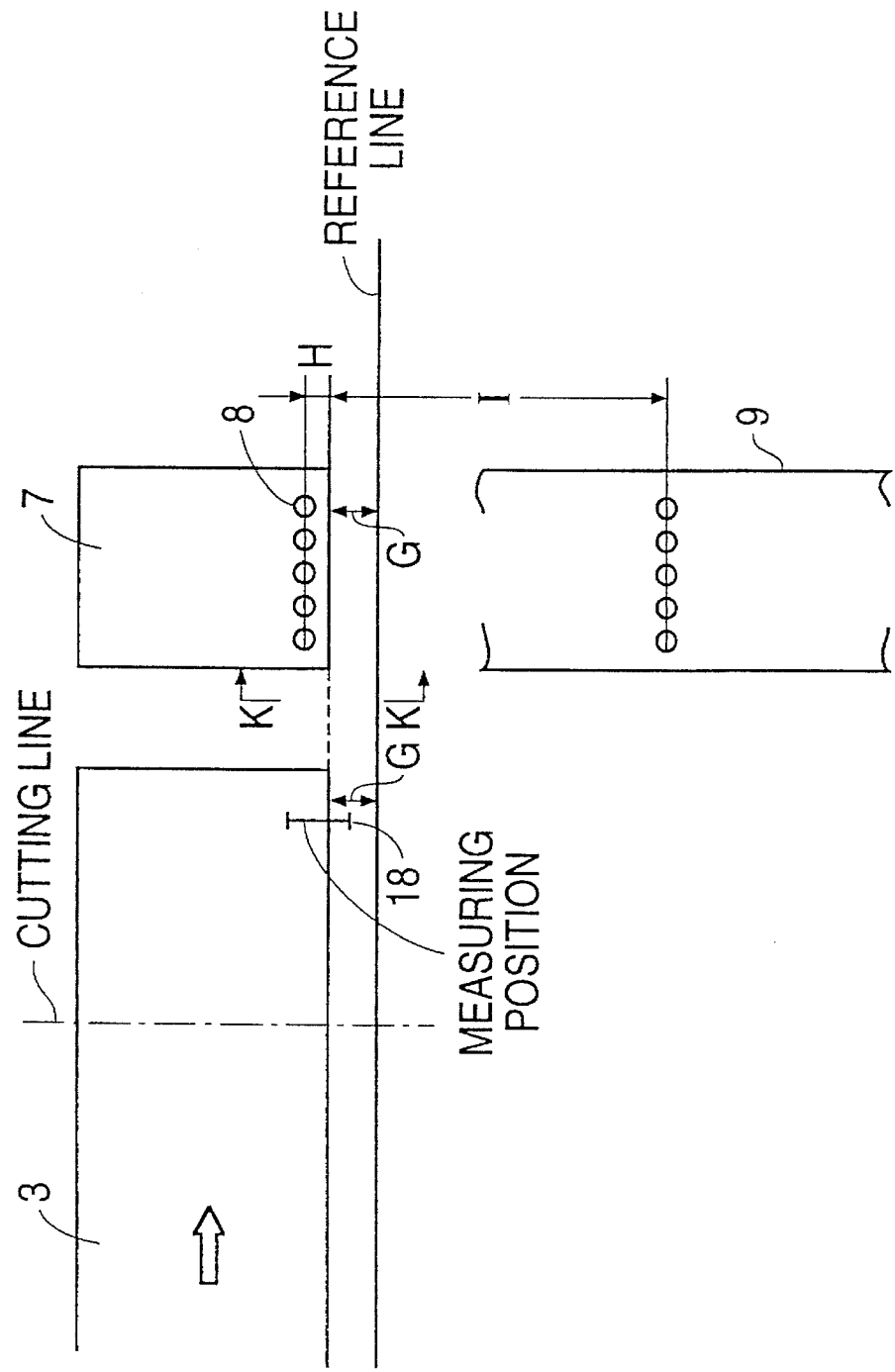
FIG. 8 is a view similar to FIG. 1 for use in explaining the operation of the sheet end position measuring unit.

In FIG. 8, a sheet 3 is conveyed by the cutting conveyer 5 with its end portion spaced by a distance G from a reference line, and is then cut. The end portion is measured by the sheet end position measuring unit 41 during the cutting operation in which the sheet is stopped. Since the fabric 7 which has been cut from the sheet 3 is conveyed by the cutting conveyer 5 without sliding, the distance G is maintained. This distance information is fed back to the vacuum conveyance unit 8, whereby the vacuum conveyance unit 8 is kept at a given distance H from a front end position of the fabric 7. Thereafter, the vacuum conveyance unit 8 is forwarded by a given distance I from a reference line so that the front end of the fabric 7 is always conveyed to a given position.

Figure 9:
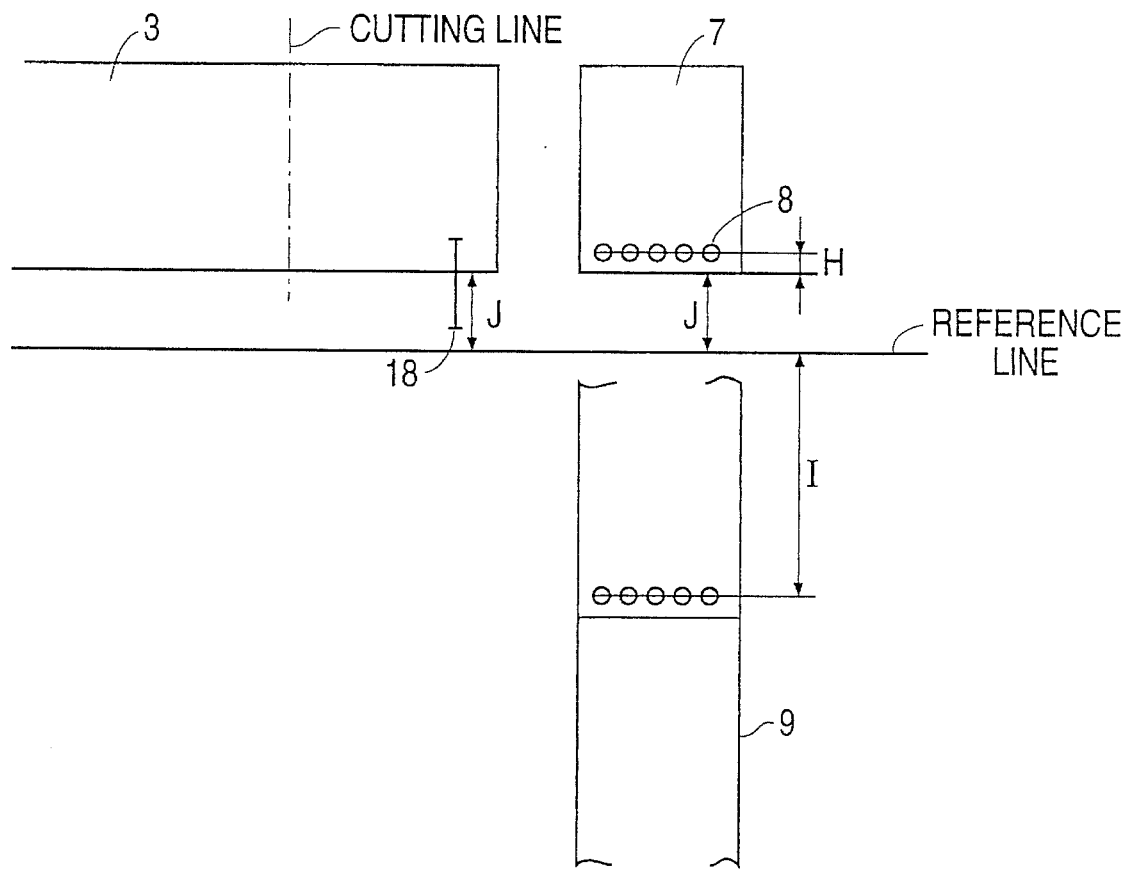
FIG. 9 is another view similar to FIG. 1 for use in explaining the operation of the sheet end position measuring unit.
Figure 10:
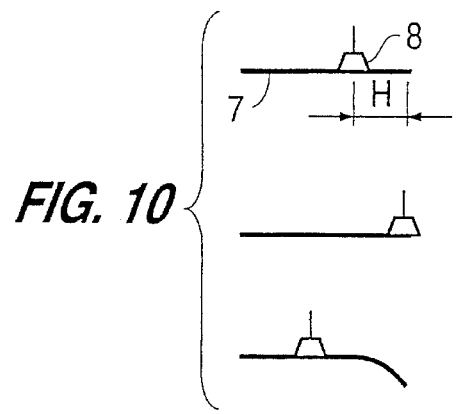
FIG. 10 is a view from the direction of the arrow K—K in FIG. 8.

FIG. 9 shows a situation in which the end of the fabric 7 is spaced by a distance from the reference line J. Even in this case, the vacuum conveyance unit 8 is located at an identical distance H from the front end of the fabric 7, and is forwarded by the distance I from the reference line so that the front end of the fabric 7 is set at the same predetermined position. It is possible to position the front end of the fabric 7 in preparation for splicing without feeding back the distance G (or J) to the vacuum conveyance unit 8, i.e. by merely conveying the fabric 7 by a distance equal to (H+G+I), (H+J+I). However, the distance H over which the front end of the cut fabric 7 can be caught by the vacuum conveyance unit 8 is rather small. Therefore, if the distance between the front end of fabric 7 and the reference line fluctuates to a large extent, the front end of the fabric 7 might not become caught by the vacuum conveyance unit 8 as shown in FIG. 10.

Now, the function of the fabric guide unit 42 will be described with reference to FIG. 11.

Figure 11A:
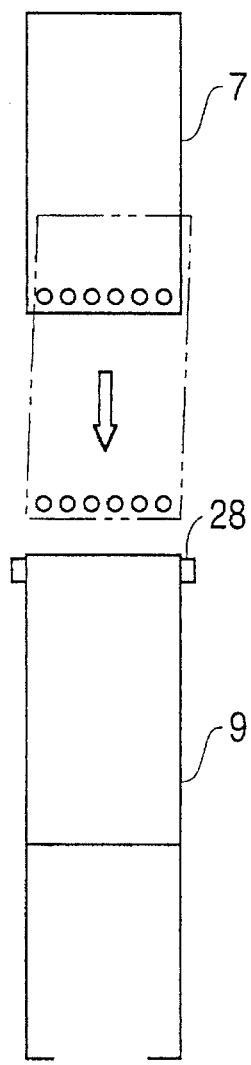
FIG. 11(a)–11(d) are plan vews of a portion of the bias cutter for use in explaining the operational steps of the fabric guide unit.
Figure 11B:
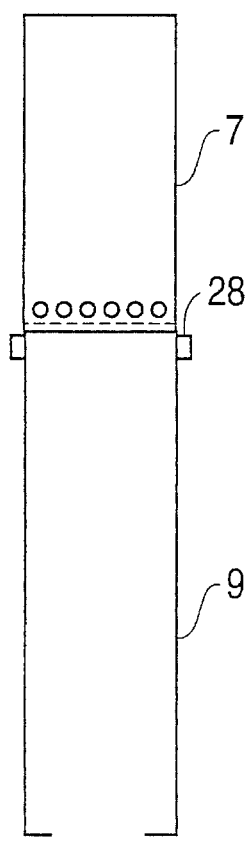

FIG. 11(a) and 11(b) show the possibility of the rear end of the fabric 7 having moved to the right or left due to the fact that the rear end is a free end during the conveyance while the front end of the cut fabric 7 is held by the vacuum conveyance unit 8.

Figure 11C:
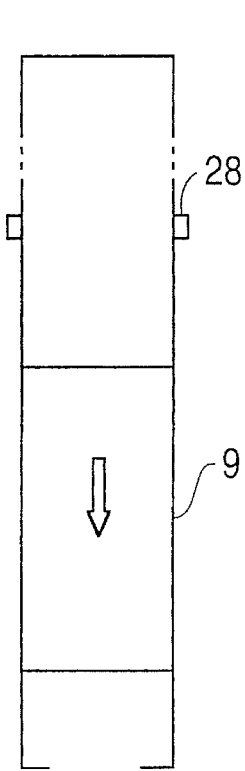
Figure 11D:
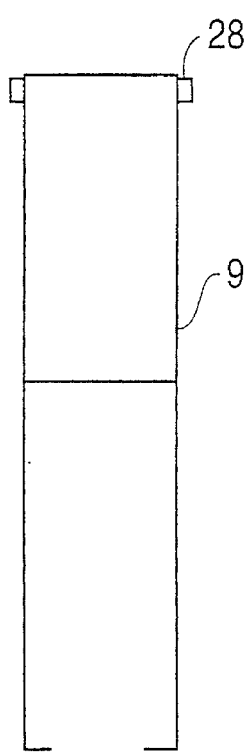

If the rear end is also held during conveyance, this rightward or leftward movement can be prevented. However, since the rear end becomes free after the fabric 7 has been spliced as shown by FIG. 11(c), the possibility remains that the rear end will move to the right or left during conveyance on the take-out conveyer 10.

For that reason, the guide blocks 28 are disposed immediately downstream of the splice position, thereby preventing such rightward and leftward movement of the rear end as shown by FIG. 11 (d).

In the device described above, the sheet end position measuring unit 41 is adopted to measure the distance from the front end of the sheet 3 to a reference line. However, the unit 41 may measure from the rear end or both ends of the fabric 7.

Also, the vacuum conveyance unit 8 has been described as holding the front end of the fabric 7 by suction. However, the unit 8 may hold the fabric 7 at other suitable locations.

A second embodiment of the present invention will be described next with reference to FIGS. 12 to 22.

Figure 12:
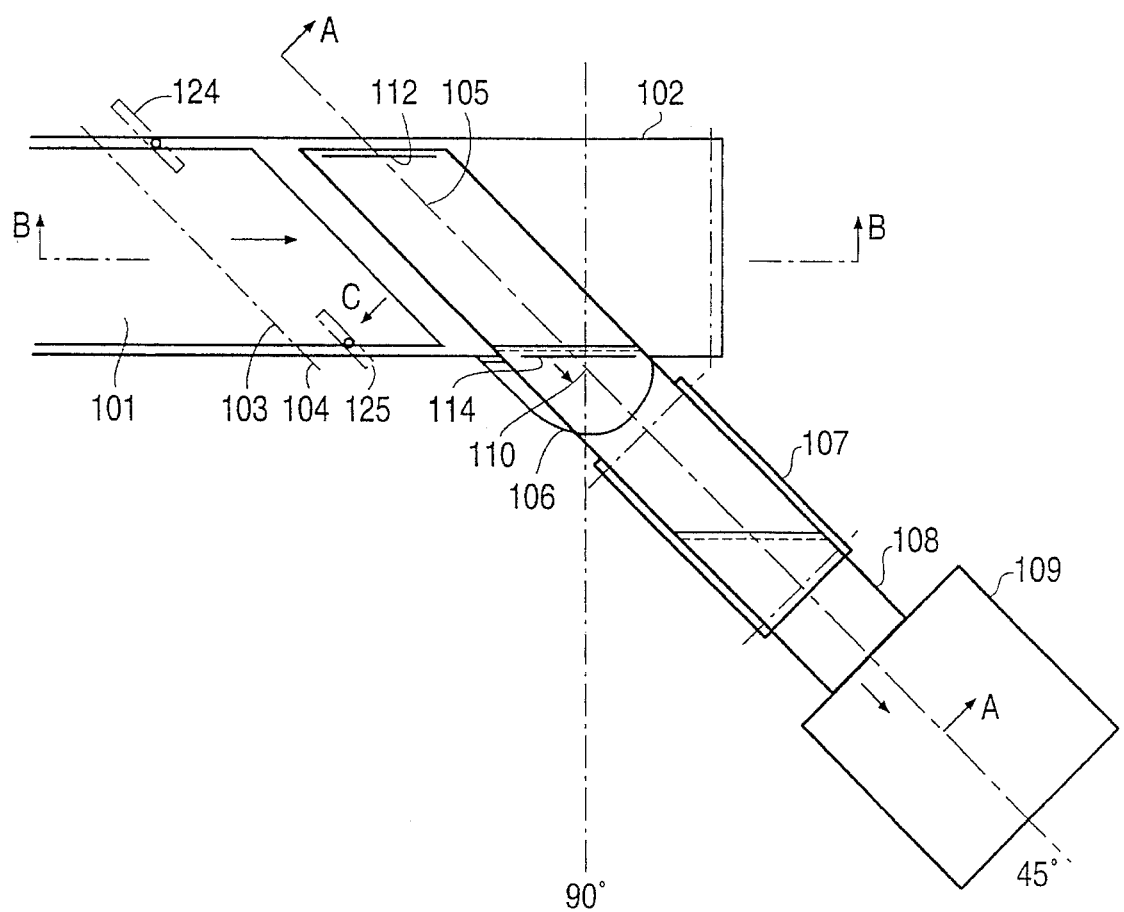
FIG. 12 is a schematic diagram of a bias cutter including a second embodiment of an auto-splice device according to the present invention.
Figure 13:
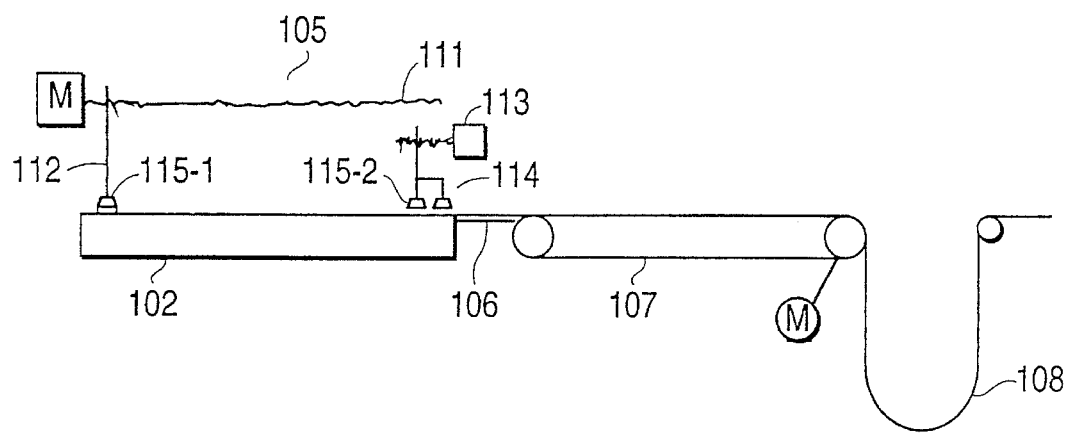
FIG. 13 is a sectional view of the bias cutter taken along line A—A in FIG. 12.

FIG. 12 is a schematic plan view of a bias cutter to which the present invention is applied, and FIG. 13 is a sectional view taken along line A—A of FIG. 12.

In FIG. 12, a sheet 101 to be cut is wound off of a material supply unit (not shown), and is then conveyed by a cutting conveyer 102. A cutting unit 103 is located midway along the cutting conveyer 102 and is rotatable about a point 104. The sheet 101 is conveyed by a predetermined amount by the cutting conveyer 102 and is then cut by a cutter of the cutting unit 103.

A splice mechanism 105, a fan-shaped table 106, a take-out conveyer 107, a festoon 108, and a reel unit 109 are arranged along a straight line downstream of the cutting unit 103. These members, except for the fan-shaped table 106, are rotatable about a point 110. FIG. 12 shows an example in which these members can be positioned 45° to 90° relative to the longitudinal axis of the cutting conveyor.

Referring to FIG. 13, the splice mechanism 105 is constituted by a first holding unit 112 which can be moved by a screw 111 along a center line of the splice device, and a second holding unit 114 which can be moved by a screw 113. The first holding unit 112 has a stroke (maximum at the minimum cut angle) that covers the length of the cut fabric. The second holding unit 114 has a stroke which can cover a possible range over which the end of the fabric to be spliced will reside on the cutting conveyer 102.

The second holding unit 114 is equipped with suction pads 115-2 aligned in a plurality of rows and which lift up the fabric so as not to contact the cutting conveyer 102. The frontmost row of suction pads 115-2 of the second holding unit 114 and suction pads 115-1 of the first holding unit 112 are arranged so as not interfere with each other during operation of the splice mechanism.

Figure 14:
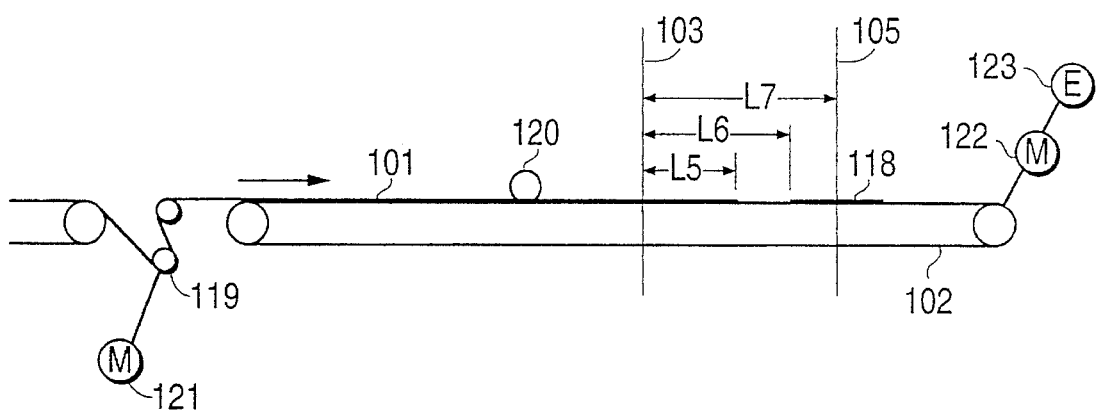
FIG. 14 is a sectional view of the bias cutter taken along line B—B in FIG. 12.

FIG. 14 is a sectional view taken along line B—B of FIG. 12. In this figure, reference numeral 118 denotes a fabric which has been cut.

A sheet conveying roller 119 is disposed at an inlet end of the cutting conveyer 102, and a drive motor 121 is controlled in accordance with instructions generated from a length measuring roller 120 which is located on an upper surface of the sheet 101. On the other hand, an encoder 123 is coupled directly with an end of a shaft of a drive motor 122 of the cutting conveyer 102 so as to control the amount of movement of the cutting conveyer 102. The sheet conveying roller 119 provides a sufficient wrap angle for the sheet 101, whereby no relative sliding therebetween occurs.

First, the sheet sending roller 119 and the cutting conveyer 102 are started simultaneously. The sheet sending roller 119 is stopped when the length measuring roller 120 has measured a required width L5, and thereafter the cutting conveyer 102 is stopped once it has sent a previously produced piece of fabric a required distance (L7–L6)/2.

As shown in FIG. 12, sheet end position measuring units 124 and 125 are disposed downstream of the cutting unit 103. The details of the measuring units 124 and 125 may be substantially the same as those shown in FIGS. 3 to 5, and therefore their description is omitted.

Figure 15:
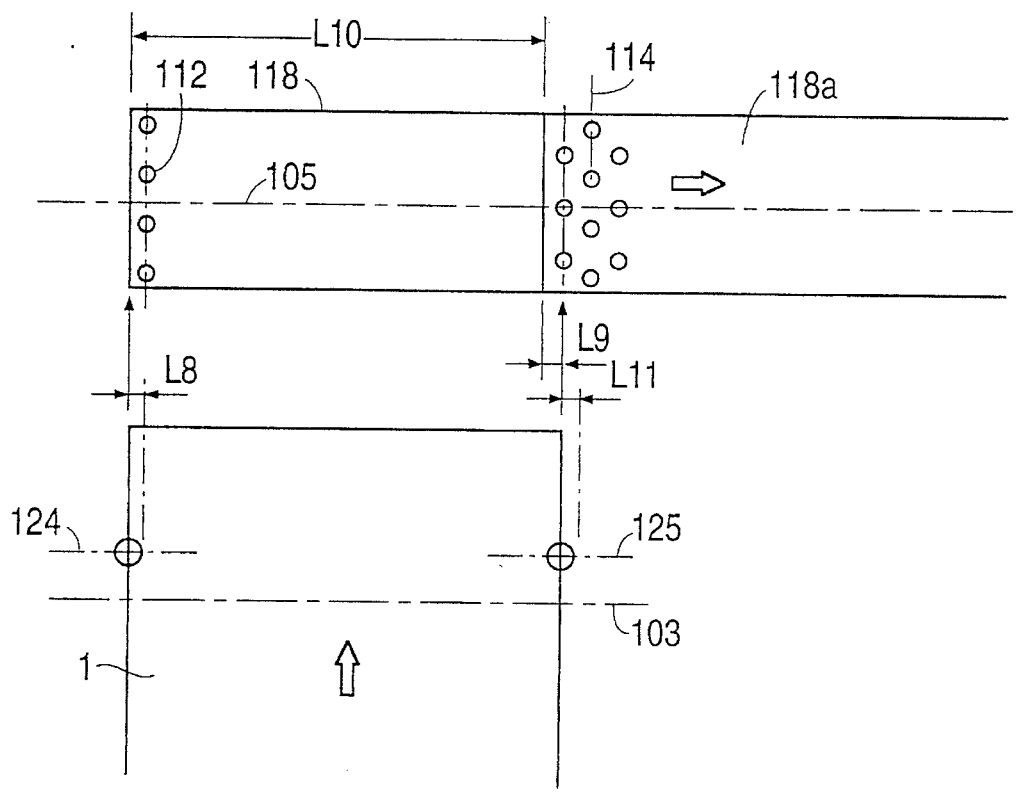
FIG. 15 is a plan view for use in explaining the operation of first and second holding units of the second embodiment of the auto-splice device.
Figure 16A:
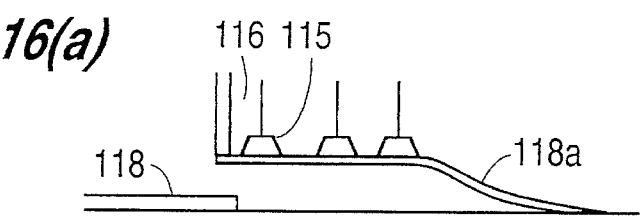
FIG. 16(a)–16(c) shown the second holding unit at various locations relative to a splicing position.
Figure 16B:
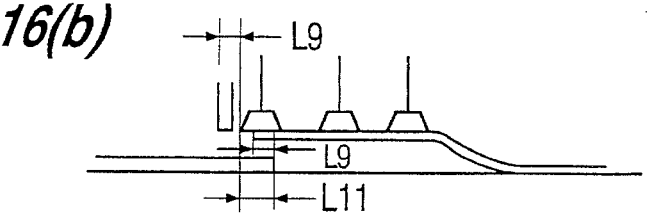
Figure 16C:
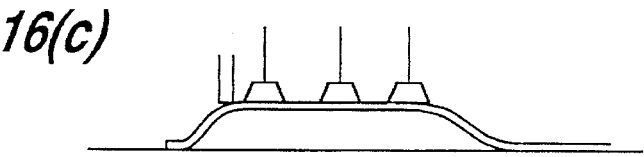

FIGS. 15 and 16 show steps of positioning the first holding unit 114. These figures show a case in which the cutting angle is 90°. However, these units function and operate the same as their cutting angles. The first holding unit 112 is moved back to a position corresponding to an end position which has been determined by the sheet and positioned measuring unit 124 during the cutting operation and is then stopped. If the end portion has fluctuated by a distance L8, the fabric 118 is fed back by a corresponding amount. The holding unit 112 sets the end portion and a distance L10 from a front end of fabric 118a to that a distance L9 exists between ends of the fabrics 118, 118a. If the end of fabric 118a fluctuates by a distance L11 from its correct position, it is fed back by a corresponding amount.

The second holding unit 114 is thus positioned in accordance with the deviation of the end portion to be joined from a predetermined position. In other words, in FIG. 16, state (a) is representative of a normal operation. In the case where the end portion of the fabric to be joined deviates from its correct position by L11 as shown in state (b), it the second holding unit 114 is not subjected to feedback to accommodate for the deviation, the end portion will not be caught by the suction pads or it will not be pressed by a splice bar 116. A deviation in the other direction causes the end portion to hang down as shown in state (c), with the result that the end portion contacts the fabric 118 which is being conveyed on the cutting conveyer 102.

Furthermore, since deviations may also result from variations in the width or position at which the sheet has been loaded in the wind-off unit, the second holding unit 114 is capable of accounting for such deviations.

Figure 17:
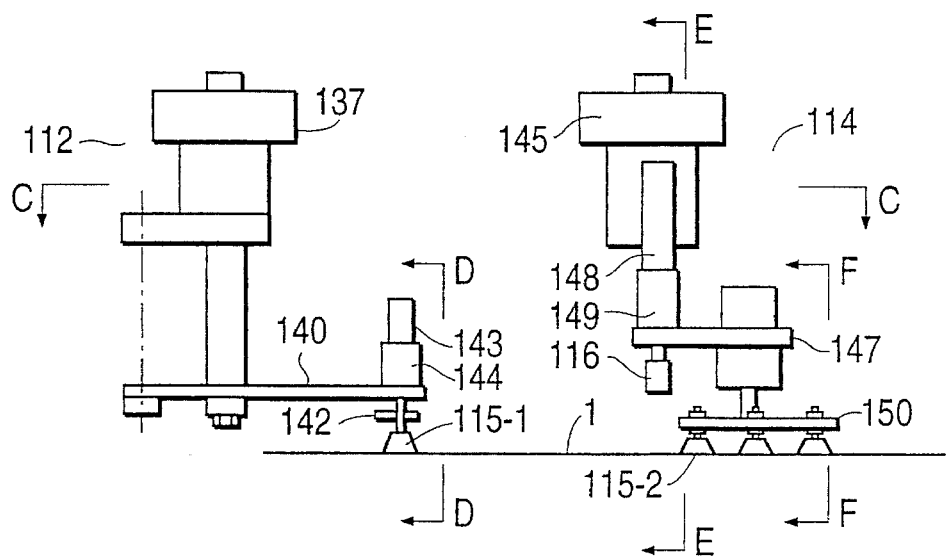
FIG. 17 is a side view of the first and second holding units.
Figure 18A:
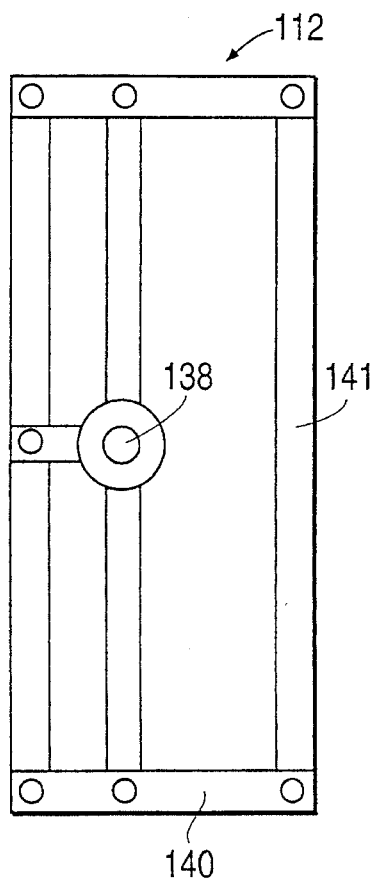
FIG. 18 is a sectional view taken along line C—C in FIG. 17.
Figure 18B:
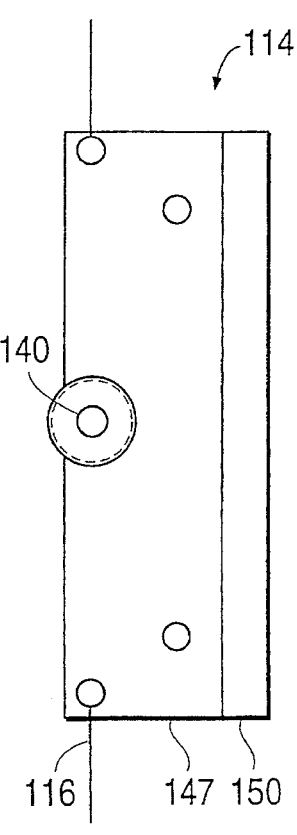
Figure 19:
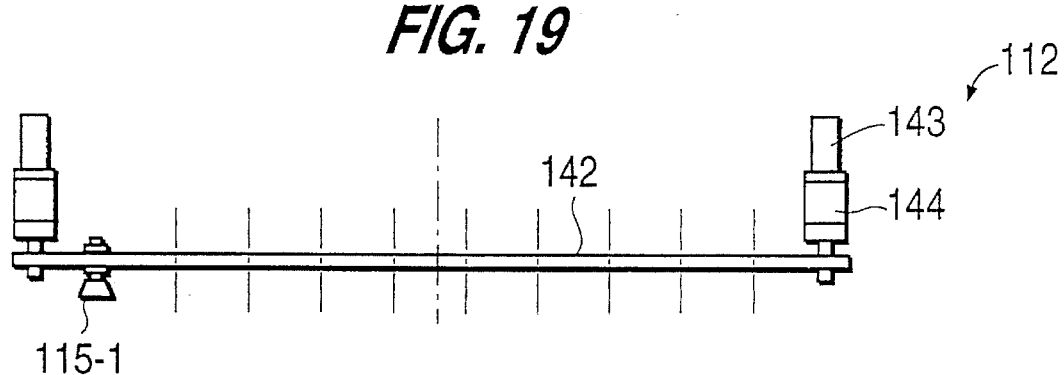
FIG. 19 is a sectional view taken along line D—D in FIG. 17.
Figure 20:
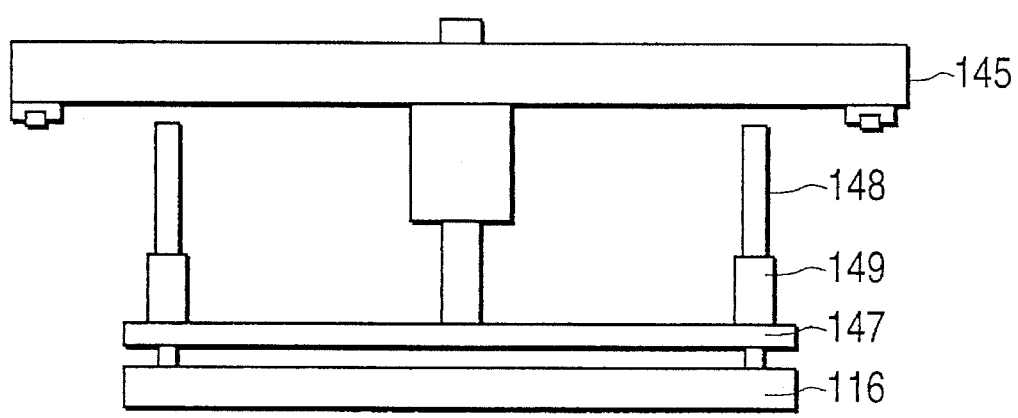
FIG. 20 is a sectional view taken along line E—E in FIG. 17.
Figure 21:
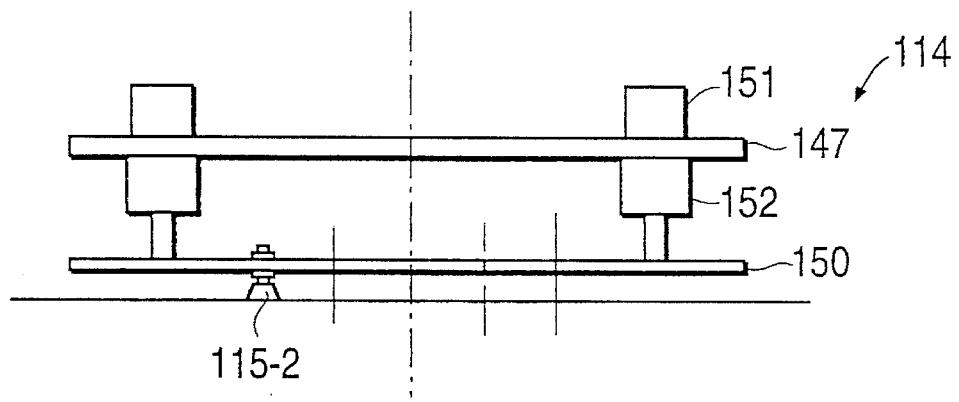
FIG. 21 is a sectional view taken along line F—F in FIG. 17.
Figure 22A:
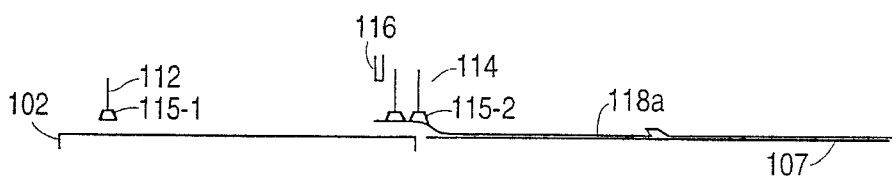
FIG. 22(a)–22(g) show the operational steps of the second embodiment of the auto-splice device.
Figure 22B:
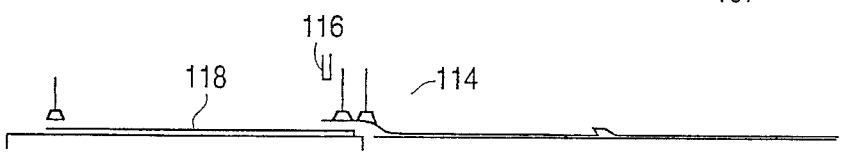
Figure 22C:
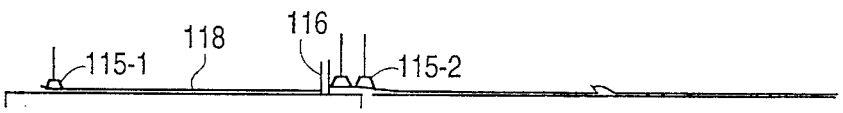
Figure 22D:
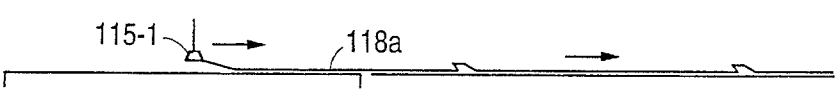
Figure 22E:
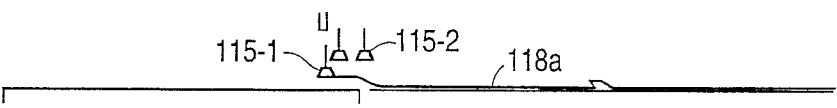
Figure 22F:
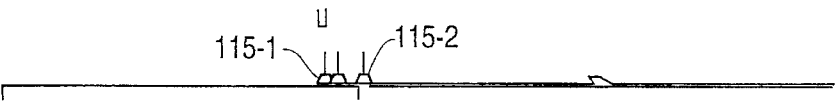
Figure 22G:
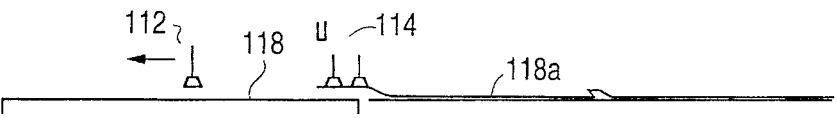

The first holding unit 112 and the second holding unit 114 will be described with reference to FIGS. 17 and 21.

The first holding unit 112 and the second holding unit 114 are counted on a rail which is not shown. A suction unit is attached to a frame 137 of the first holding unit 112 in such a manner that it can be rotated about a point 138 in accordance with a cutting angle by means of a rotating unit (not shown). Further, the suction pads 115-1 can be rotated about a center 141 of the splice device by a link mechanism 140. The suction pads 115-1 are attached to a common plate 142 and vertically driven through a guide 144 by an air cylinder 143.

On the other hand, the suction pads 115-2 and splice bar 116 of the second holding unit 114 are attached to a frame 145 of the holding unit 114 through a plate 147 so as to be rotatable about a rotary center 14, similar to the holding unit 112. The rotary center 146 intersects the center of the splice bar 116. The splice bar 116 is driven vertically through a guide 149 by an air cylinder 148, and the suction pads 115-2 are attached to a common plate 150 and driven vertically through a guide 152 by an air cylinder 151.

The suction pads 115-1 and the frontmost row of suction pads 115-2 are arranged alternately for delivery of the fabric so that these pads 115-1 and 115-2 can hold the end portion of the fabric simultaneously. At this time, the splice bar 116 is lifted up so as not to interfere with the suction pads 115-1.

The auto-splice device of this second embodiment preferably includes a guide unit for guiding both side edges of the fabric 118, similar to the guide unit 42 of the first embodiment.

The basic operation of this device will be described with reference to FIG. 22.

FIG. 22 is a schematic diagram corresponding to that of FIG. 13, except that the fan-shaped table 105 is omitted and the splice bar 116 is shown.

(a) A rear end of the fabric 118*a* which has already been spliced once is caught and held by the second holding unit 114 so as to be lifted up.

(b) The fabric 118 is conveyed to a splice position by the cutting conveyer 102.

(c) The suction pads 115-1 of the first holding unit 112 are moved down and hold the rear end of the fabric 118. As the suction pads 115-1 raise the rear end of the fabric 118, the suction pads 115-2 of the second holding unit 114 are moved down so that the front end of the fabric 118 is joined with the rear end of the fabric 118*a*. Thereafter, the joined portion is crimped by the splice bar 116, and the suction pads 115-2 and the splice bar 116 are then elevated.

(d) While the rear end of the fabric (now referred to as fabric 118*a*) is held by the first holding unit 112, the fabric 118*a* is taken out by the take-out conveyer 107.

(e) The rear end of the fabric 118a is stopped at a fabric splicing position.

(f) The first holding unit 112 is moved down, and then the second holding unit 114 is moved down so that the rear end of the fabric 118*a* is caught and held by the units 112 and 114. Thereafter, the suction pads 115-1 of the first holding unit 112 release the fabric 118*a* and the fabric 118*a* is elevated by the second holding unit 114.

(g) The first holding unit 112 is moved back toward the rear end of the fabric 118, and while the second holding unit 114 holds up the rear end of the fabric 118*a*, the fabric 118 is introduced there under by the cutting conveyer 102.

This embodiment has the following advantages.

(1) When the fabric is moved to a splicing position, the rear end of the fabric is held by the first holding unit so that the shape of the rear end of the fabric can be retained.

(2) The movement of the first and second holding units is controlled by the sheet end position measuring unit, whereby the respective front and rear end positions of the current and preceding fabrics are properly controlled, as a result of which a given amount of overlapping can be ensured.

(3) With the above advantages (1) and (2), a reliable splice can be achieved.

(4) The device has a comparatively simple structure.

(5) Since the end of the fabric to be spliced is held until the splicing is completed, the splicing can be performed without the need for complicated equipment such as a unit for detecting a state of an end portion of the fabric to be spliced, a unit for correcting the state of the end portion in accordance with such detection, and the like.

The foregoing description of preferred embodiments of the invention is not intended to be exhaustive or to limit the invention to the precise form disclosed, and modifications and variations are possible in light of the above teachings. All such modifications and changes are seen to be within the true spirit and scope of the invention as defined by the appended claims.

What is claimed is:

1. An auto-splice device comprising: a cutting section including a cutting conveyer, and cutting means for cutting a sheet on the cutting conveyor across the sheet to produce a fabric a take-out conveyor disposed downstream of said cutting conveyer; a vacuum conveyance means for conveying the fabric from said cutting conveyer onto said take-out conveyer; splice means for splicing the fabric to another piece of fabric on said take-out conveyer; and sheet end position measuring means for measuring the distance between a reference line and at least one side edge of the sheet during the cutting of the sheet with said cutting means and for controlling said vacuum means to catch and hold the fabric at a location determined based upon said distance.

2. An auto-splice device as claimed in claim 1, and further comprising a fabric guide unit including a pair of guide blocks positioned to guide opposite side edges of the fabric along said take-out conveyer, said guide blocks being disposed immediately downstream of a position at which an end of the fabric is spliced to an end of the another piece of fabric on said take-out conveyer.

3. A method of splicing pieces of fabric to one another, said method comprising:

cutting a sheet, lying on a conveyor, thereacross to produce a first piece of fabric;

while the sheet is being cut, measuring the distance between a reference line and at least one edge of the sheet which will form an end of the first piece of fabric;

catching the first piece of fabric with suction from a vacuum conveyance unit at a location on the piece of fabric determined on the basis of said measuring;

while the first piece of fabric is caught, moving the vacuum conveyance unit to overlap a front end of the first piece of fabric with a rear end of a second piece of fabric; and splicing the ends of the pieces of fabric together while the ends are overlapped.

4. A method as claimed in claim 3, and further comprising conveying the spliced pieces of fabric to move a rear end of the first piece of fabric to a splicing position at which it will be spliced to another piece of fabric, and guiding opposite side edges of first piece of fabric as the spliced pieces of fabric are being conveyed so that the rear end of the piece of fabric does not move laterally as the rear end is moved to the splicing position.

* * * * *